HERBERT S. BARBEHENN
BILLY R. DOTSON
ROBERT F. WILLIAMS, JR.
INVENTORS

ATTORNEYS

United States Patent Office 3,503,786
Patented Mar. 31, 1970

3,503,786
MULTILAYER FILMS FOR OVERWRAPPING AND
PROCESS FOR PRODUCING SAME
Herbert S. Barbehenn, Billy R. Dotson, and Robert F. Williams, Jr., Rochester, N.Y., assignors to Eastman Kodak Company, Rochester, N.Y., a corporation of New Jersey
Filed July 17, 1967, Ser. No. 653,924
Int. Cl. B44d 1/14
U.S. Cl. 117—76
14 Claims

ABSTRACT OF THE DISCLOSURE

This invention provides multilayer films composed of a base of a polymer film, an interlayer of a modified thermally-degraded polyethylene and a surface of poly-(vinyl acetate); said multilayer films being produced by a process comprising the steps of: coating at least one surface of a polymer film with a modified polyethylene-solvent composition composed of a modified thermally-degraded polyethylene dissolved in xylol or toluol; drying the modified polyethylene-solvent composition; fusing the dried modified polyethylene-solvent composition to the surface of the polymer film to thereby form a fused modified polyethylene layer; overcoating this latter layer with a poly(vinyl acetate) resin solution or emulsion; drying the overcoated poly(vinyl acetate) resin solution or emulsion; and curing the dried overcoating of poly(vinyl acetate).

Figure 1:
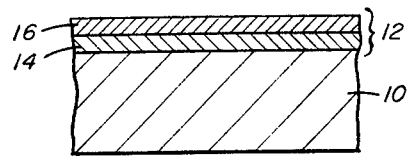

This invention relates to self-lubricating, high slip, heat-sealable polymer films which have important uses in the packaging and wrapping fields. More particularly, this invention relates to new and unique polymer film articles, which are essentially polymer films coated with compositions that permit the films to be heat sealed without adversely affecting their physical properties or requiring further treatment.

Heretofore, heat-sealable "moistureproof" cellophane has been widely used and has been commonly heat-sealed in conventional heat-sealing packaging machinery, the heat sealing occurring at moderately elevated temperatures in the range of 275° F. to 400° F. The conventional heat-sealing so-called "moistureproof" cellophane consists of a regenerated cellulose film coated with a nitrocellulose layer. It provides much greater moisture resistance than does ordinary uncoated cellophane, which had earlier been used, and has been widely used for the last twenty years or more for the packaging of bakery goods, meats, dried peas and various other grocery items, hardware items, etc. However, ordinary "moistureproof" cellophane is only relatively moisture resistant and it is usually not recommended as a transparent packaging material for powdery materials such as dried milk, soft drink powders, hygroscopic drug or chemical powders, etc. Indeed, ordinary hard candies packaged in so-called "moistureproof" cellophane, when allowed to stand for a period of time under hot, humid atmospheric conditions, become stuck together in a manner undesirable from the merchandising viewpoint.

In an effort to provide a more moisture resistant material, suitable for packing items for which ordinary heat-sealing "moistureproof" cellophane is not satisfactory, a polyethylene-coated cellophane film has recently had considerable usage, although the volume of its usage has been very small compared with that of ordinary "moistureproof" cellophane. The polyethylene coated cellophane has the advantage that it lends itself to use in conventional heat-sealing equipment. It has the further advantage of improved moisture resistance thus making it suitable for packaging items like powdered sugar, dried soft drink mix, etc., for which conventional "moistureproof" cellophane is not sufficiently moisture impervious. Polyethylene-coated cellophane, however, has the disadvantage that it is subject to delamination, i.e. the cellophane layer, being sensitive to water and humidity conditions, becomes flimsy if the package becomes wet on the outside, and becomes relatively brittle under very dry conditions and, consequently, separates from the polyethylene coating.

In recent years, plain polyethylene film has been used in making transparent packages. However, conventional polyethylene film does not lend itself to heat-sealing on ordinary conventional jaw-type heat-sealing packaging machinery, such as has been particularly useful in the case of sealing "moistureproof" cellophane, although special techniques have been developed by which packages made from plain polyethylene have been heat sealed. Nonetheless, these special techniques require closer supervision and therefore are relatively more expensive and are not nearly so widely used as the conventional techniques used to heat-seal "moistureproof" cellophane.

Other films, making up less than 20% of the packaging industry, include rubber hydrochloride films, vinylidene chloride based films, vinyl chloride-vinyl acetate copolymer films, cellulose acetate films, and polyester films. Unfortunately, none of these materials lend themselves to ready use on the most widely available types of heat-sealing packaging machinery. The rubber hydrochloride films have a relatively low maximum use temperature, e.g. about 200° F., and these films present a distortion problem. Vinylidene chloride films, in the thin gauges used in packaging, are very difficult to handle on packaging machinery, and have a very narrow range in which a heat-seal can be effected. Additionally, they present a static electricity problem. Also, when a vinylidene chloride film is heat-sealed, this causes shrinkage and puckering, which spoils the attractiveness of the package which it is desired to preserve.

Vinyl chloride-vinyl acetate copolymer films, used to a very limited extent in the packaging field, cannot be heat-sealed on conventional packaging machinery, and are sealed only with difficulty, for example, by the use of electronic methods, where the films are fused or welded together ultrasonically. Additionally, these films have a relatively low maximum use temperature and unless highly plasticized, are not useful at low temperatures; and, if highly plasticized, they present plasticizer problems with respect to migration, staining, toxicity, etc. Cellulose acetate films likewise cannot be heat-sealed by conventional cellophane heat-sealing methods. Polyester films, while providing great strength and many advantages, never had any substantial use in the packaging field prior to our invention, since they could be heat-sealed only at relatively high temperatures. Such films melt at around 490° F., and the polymers degrade at a temperature very close to that required for heat-sealing. The polyester films are not heat-sealable on any conventional heat-sealing packaging machinery and no practical machinery had been developed prior to this invention to make polyester film usable to any substantial extent for packaging.

Some attempts were apparently made heretofore to laminate another film to a polyester film so as to make a polyester film useful in packaging. Some efforts were made, for example, to laminate a film of polyethylene to a polyester film, but most of these efforts resulted in laminated film which would not remain bonded at the interface between the polyester and the polyethylene under conditions of usage. Modifying the surface of polyester films with selected coatings or deposits, especially the coating of a high density polyester with a low density polyester, has also been proposed and tested. Although surface modifications of this type have been found to be useful for improving or altering the heat-sealing characteristics of the coated polyester support, it has been discovered that such surface modifications have the decisive disadvantage of increasing the blocking tendency and reducing the slip of the polyester support. Furthermore, the slip characteristics of surface deposits of the effective heat-sealing coatings heretofore known cannot be appreciably modified through the addition of a slip additive without reducing their scuff or abrasion resistance. Thus, as a result of these limitations it has heretofore been very difficult to produce a polyester film that could be heat sealed without extensive and expensive preconditioning steps.

Therefore, it is readily apparent that the production of a polymer film such as a polyester, cellulose ester or polyolefin film in which significantly improved heat-sealing characteristics are obtained while acceptable haze, stiffness and handling qualities are retained, represents a long sought after solution to an extremely perplexing problem.

Therefore, an object of this invention is to provide a clear, stiff and inexpensive moisture resistant polymer film that can be heat sealed by conventional means at a relatively low temperature.

Another object of this invention is to provide surfaces on polymer films and sheetings which heat seal below the softening temperature of the support, yet do not cause the scuff-susceptibility or blocking and slip characteristics of the support to become objectionable.

A further object of this invention is the provision of a self-lubricating, high slip, heat-sealable polymer film that has good resistance to scuffing or abrasion, an extremely low haze factor and a low heat sealing point, and that will not block.

A still further object of this invention is to provide a method whereby a polymer film can be coated with polyvinyl acetate compositions to give an inexpensive heat sealable overwrap material that has a low haze, can be easily opened, and is highly adaptable to usage in present heat sealing apparatus.

Yet another object of this invention is to provide a clear multilayer film which permits transmission of gases, but is practically impervious to moisture.

Figure 2:
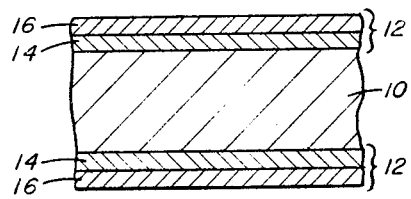

These and other objects and advantages of this invention will be more apparent upon reference to the following description, specific working examples, and the appended drawing of which:

FIGURE 1 is a cross-sectional view of the most simplified embodiment of the present invention; and FIGURE 2 is a cross-sectional view of a preferred embodiment of the present invention.

As can be concluded from the above discussion, in order for a heat-seal coated film to be considered as commercially practical it should have the following characteristics:

(1) When the film is heat sealed it should produce a strong bond. Minimum acceptable heat seal strength has been found to be about 0.15 lb./in. on films sealed at 225° F. using a one-second heating iron dwell time.

(2) The film should be slippery enough to feed in automatic packaging machines without sticking. Maximum acceptable static coefficient of friction has been found to be about 0.60 and the maximum acceptable kinetic coefficient of friction about 0.50. The preferred values would be 0.50 or less for static coefficient of friction and 0.40 or less for kinetic coefficient of friction. Coefficient of friction is measured in accordance with ASTM D1894, Procedure B, "Tests for Coefficient of Friction of Plastic Films."

(3) While the film should be slippery enough to feed properly there must not be an excessive amount of slip additive on the surface, as this gives the film an undesirable, soft, greasy feel.

(4) Packages overwrapped with the film should not block, i.e. stick to each other when placed in contact with each other.

(5) The heat-sealable coating or overlayer of material placed on the film support should be of a type that will not separate from the film.

Ideally, this overlay material should also be as thin as possible (of the order of 0.01 to 0.1 mil) and clear of any haze, distortion or discoloring properties. However, as a general rule, acceptable haze values are 3% or less, and slight distortion (on heating) and slight discoloration is permissible.

These characteristics are especially important if the film is to be used for packaging articles in a cellophane-type overwrapping machine. Although, just prior to the present invention, it was generally conceded by those working in the cellophane-type overwrapping art that a film product having all of the above-listed attributes could not be produced, it has now been found that such a heat-sealable film not only can be produced, but that it can be manufactured in such a manner as to be highly competitive commercially with any heretofore known heat-sealable, highly moisture resistant film.

According to this invention it has been found that such a novel and unique film can be produced by placing an interlayer over the polymer support prior to placing a surface coating of a heat-sealable poly(vinyl acetate) composition thereon. The interlayer consists of a specially modified polyethylene.

As shown in FIGURE 1 of the drawing, the simplest form of the multilayer overwrapping film of this invention consists of a polymer film base 10 having a two-layer coating 12 upon at least one surface thereof. The two-layer coating 12 consists of an interlayer 14 comprising a modified thermally-degraded polyethylene having an acid number of at least 3 and an overcoating layer 16 comprising a heat-sealable poly(vinyl acetate) resin film. In the preferred embodiment of the invention, depicted in FIGURE 2, the polymer film 10 has the two-layer coating 12 upon both of its opposing surfaces.

The process aspect of the present invention, in its most basic form, involves applying at least two special coatings in a specific sequence over a preferably high melting, moisture resistant polymer support sheet or film. Preferably the polymer support consists of a relatively water-impermeable high density polyethylene, cellulose acetate or polyester film. However, almost any polymer film that is substantially impervious to water at thicknesses of 1 mil or more (preferably one having a haze value of less than 3%) can be utilized as the base or film support of this invention. The films of polyolefin materials suitable for use in this invention, such as polyethylene, polypropylene, polybutylene and the like, are those conventional films prepared for example, by forming a melt of the resin and extruding the melt through an enclosed path and through a die of predetermined orifice size. The film which ultimately leaves the die is generally passed through a small air gap and then immersed in a water bath maintained at a temperature considerably lower than that of the melt. In this manner the film is hardened, prior to being passed through and around a plurality of compression and idler rolls (located exteriorly of the water bath) which apply sufficient compression to the film to bring about a reduction of the film gauge to about 1 mil (½ to ⅛ its original thickness). The film in its final form is then wound onto a suitable take-up roll or spool for storage until it is ready to be coated in accordance with this invention. It should be appreciated that, whenever desirable, the multilayer coating of this invention can be applied to the compression rolled polyolefin film prior to its being wound onto the first take-up roll or spool. Polyester films such as poly(ethylene terephthalate), poly(1,4-dimethylcyclohexene terephthalate), and the like, suitable for use in this invention may be formed according to any conventional sheet or film-forming means, as may other moisture impervious polymer films such as the cellulose esters, i.e. cellulose acetate, cellulose propionate, cellulose butyrate and cellulose triacetate, whose use in this invention is practicable.

The first of the two special coatings that are applied over the surface of the relatively moisture resistant polymer film is comprised of (1) a modified thermally-degraded polyethylene and (2) a liquid solvent; the latter component being later evaporated and hence absent from the finished film. The modified thermally-degraded polyethylene consists essentially of specially treated, extremely low molecular weight polyethylene in the molecular weight range of between about 1,000 and about 10,000 which has first been made more reactive by partially degrading the polyethylene, and has then been reacted with an unsaturated polycarboxylic acid or anhydride thereof as described below. The amount of the above polyethylene present in the initial coating solution is not critical so long as a layer of at least a thickness of from 0.005 to 1 mil remains after drying.

One method of preparing the modified polyethylene compositions of this invention is to react thermally-degraded polyethylene with unsaturated polycarboxylic acids, or anhydrides thereof. The thermally-degraded crystallizable polyethylenes are prepared from crystalline polyethylenes prepared by conventional polymerization processes for preparing low, medium and high density polyethylene. These low, medium and high density polyethylene polymers include commercially available low, medium and high density polyethylene.

One such suitable polymer is the highly crystallizable polyethylene having a density in the range of about .91 to .98 measured in a density gradient tube using a thermally conditioned sample (ASTM D1505–63T). Thermal degradation of these polyethylene polymers apparently takes place at the points of chain branching of the polymer molecule. The degree of degradation can be controlled by reaction time and temperature to give a thermally degraded low molecular weight crystallizable polyethylene material having a melt viscosity range of from 260–15,000 centipoise at 150° C. (ASTM D1238–56T using .04±.0002 inch orifice) and an instrinsic viscosity of about 0.05 to .5 [Skulken and Sparks, J. Polymer Sci., 26, 227 (1957)]. By carefully controlling the time, temperature and agitation, a thermally-degraded polyethylene of relatively narrower molecular weight range than the unmodified high molecular weight polyethylene can be obtained. The degradation can be carried out at a temperature of from 290° to about 425° C. These thermally-degraded products are not emulsifiable. However, on reaction with unsaturated polycarboxylic acids or anhydrides thereof, the acid number and saponification number of the thermally-degraded polyethylenes are increased making them emulsifiable.

The thermally-degraded polyethylene can then be reacted with unsaturated polycarboxylic acid or anhydrides thereof via conventional procedures at temperatures above 200° C., preferably in the absence of both oxygen and any catalyst. The reaction may be carried out in a suitable melt atmosphere, such as nitrogen, but pressure is not necessary for carrying out the process. Reaction time is dependent on temperature and may vary between 15 minutes and four hours.

Unsaturated polycarboxylic acids and anhydrides thereof suitable for reacting with the thermally-degraded polymers are, for example, maleic acid, maleic anhydride, citraconic anhydride, aconitic anhydride, itaconic anhydride, or those compounds such as citric acid which form these compounds at reaction temperatures. These modified polyethylene compositions (hereinafter referred to as modified thermally-degraded polyethylenes) have a melt viscosity of 250–5,000 centipoise at 150° C. and an acid number of at least 3 and preferably about 6–20. Best results are obtained with maleated polyethylenes, prepared as above, whose average molecular weight ranges from about 2,500 to about 3,000.

The acid number, which is defined as the number of milligrams of potassium hydroxide needed to neutralize the free acid in one gram of a sample, is of significance in this application, since unless there is sufficient maleic or other acid or anhydride addition to the polyethylene to raise the acid number of the modified polyethylene to at least 3, the modified polyethylene will not be sufficiently hydrophilic to permit bonding of the ionic poly(vinyl acetate) to the modified polyethylene layer. Thus, although a minimum acid number of 3 is required, a minimum of 6 is preferred. When the acid number of the modified thermally-degraded polyethylene exceeds the preferred upper value of about 20, there is usually a loss of some of the physical properties of the polyethylene and hence a modified thermally-degraded polyethylene which is less suitable as a polymeric interlayer between the substrate moisture resistant film base and the heat-sealable poly(vinyl acetate) layer results.

The second of the two special coatings which is used as an overlay heat-sealable coating is applied by drying and fusing a solution comprised of: (1) a liquid solvent or carrier medium; and (2) a heat-sealable poly(vinyl acetate) resin.

Various liquid solvents such as butyl acetate and methyl isobutyl ketone can be used to give the poly(vinyl acetate) solution. Solvents such as toluene are preferred since they give a clear blend and acetone is further preferred as providing the clearest blend of any solvent tested. Generally, the concentration of the poly(vinyl acetate) resin in the solvent ranges from about 5% to about 15%. Alternatively, the poly(vinyl acetate) may be applied as an emulsion with the resin dispersed in a suitable carrier medium such as water.

The poly(vinyl acetate) compositions which are dissolved in the above-described solvents or form an emulsion in a suitable carrier medium are the conventional poly(vinyl acetates) that are solid at room temperature and are heat sealable. Generally, the poly(vinyl acetate) monomer can be preformed in the liquid phase by the reaction of acetic acid with acetylene in the presence of a mercuric catalyst and a reaction promoter such as boric acid, boron fluoride, methane trisulfonic or any of the other methods as described in U.S. Patents 2,329,644, 2,021,873 and 2,351,664. Alternatively, the monomer may be prepared, for example, in the vapor phase by the passage of acetylene gas over acetic acid at a temperature of 120° C. to yield a 5 to 1 acetylene to acetic acid vapor mixture which is subsequently heated to 180° C. and passed over a zinc acetate catalyst as described in U.S. Patent 1,822,525. Similarly, the same method may be exercised using a different catalyst such as zinc-cadmium-mercury chromite as disclosed in U.S. Patent 2,411,962 or zinc or cadmium silicates as disclosed in U.S. Patent 2,521,113.

Such monomers may be subsequently polymerized according to any conventional vinyl polymerization technique including bulk polymerization in ethyl acetate as disclosed in U.S. Patent 2,122,805.

The final poly(vinyl acetate) composition must be atactic and hence amorphous. Furthermore, the poly(vinyl acetate) resins must be solid at room temperature and also be capable of becoming sticky and undergoing cold flow at temperatures below 200° F. so that heat sealing can be preformed at these temperature levels. The poly(vinyl acetates) which meet the above qualifications are generally those having molecular weights ranging from about 90,000 to about 160,000, inherent viscosities from about 0.52 to about 0.68 according to ASTM D1243–58T, Procedure A, and tensile strengths ranging from about 2,600 to about 4,200 lb. per square inch while having the above-described softening temperature of below 200° F.

In the preferred embodiment, the poly(vinyl acetate) solution contains a hardening wax for the poly(vinyl acetate). Waxes which are effective in this surface coating include carnauba, a product of wax palm, Halowax, a chlorinated naphthalene and generally any reasonably hard wax which is compatible with the other ingredients of the solution and the final layer at least to the extent that the blend produces any overlay suitable for use in the invention and preferably the clear overlay of the preferred embodiments, although hazy, blends can be applied when clarity of the film is not required. Preferred (for optimum results) is Chlorowax, a chlorinated paraffin which improves scuff resistance and slip when utilized as a hardener and antiblock agent.

As will be apparent to those skilled in the art, waxes other than chlorinated paraffins that do not interfere with or weaken the bond between the poly(vinyl acetate) composition and the modified thermally-degraded polyethylene and which raise the blocking temperature of the poly(vinyl acetate) are satisfactory for use in this application. Antiblocking agents such as the silicas and/or slip agents such as silicones or fatty acid derivatives, for example, Cab-O-Sil (a silica), ethyl cellulose, Armour 210 (a conventional modified fatty amide), and cellulose butyrate may be incorporated into the compositions provided they do not interfere with the adhesion of the coatings to each other, increase the haze of the film significantly in applications where haze is of importance or adversely affect the heat sealing properties of the finished film.

Of course, any combination of the above-described hardeners and antiblocking agents may be added to the poly(vinyl acetate) layer to achieve the particular scuff, heat sealing haze and blocking properties desired in a particular application. Likewise, in specific applications certain of these properties may be sacrificed in order to obtain improvement in other properties which are either necessary or more desirable in the particular application. Example IV set out below utilizes a combination of several hardeners and antiblocking agents to obtain a multiplayer film which is adequate in all respects as a food-wrapping.

For best results, the poly(vinyl acetate) layer which is applied is so thin (ranging from .01 to .08 mil) that it appears as a lace-like network rather than a continuous film when viewed through a microscope or magnifying glass.

It has been found that not only must each constituent of the two coating materials be present before an acceptable heat sealable film can be formed, but that such a film can be formed only if specific process steps are rigidly followed. Basically the heat sealable films are produced by the following procedure:

(1) Coating at least one surface of a moisture resistant polymeric film with a modified, thermally-degraded polyethylene-solvent composition so that from about 0.005 to 0.1 mil of solid modified thermally-degraded polyethylene is left on the film after the solvent is evaporated;

(2) Drying the modified, thermally-degraded polyethylene-solvent composition;

(3) Fusing the modified thermally-degraded polyethylene to the polymeric base;

(4) Overcoating the dried and fused, modified, thermally-degraded polyethylene surface or surfaces of the film with a poly(vinyl acetate) composition;

(5) Drying the overcoating; and (6) Curing the dry overcoating of poly(vinyl acetate).

According to the preferred embodiment, the modified thermally-degraded polyethylene-solvent composition of step 1 is formed by mixing a modified thermally-degraded polyethylene having an acid number above 3.0 with a liquid solvent such as turpentine, naphtha, toluene, xylene, propylenedichloride, tetrachloroethane, tetrachloroethylene, and preferably toluene, at a temperature of between 110 and 150° F. The concentration of the specially modified polyethylene ranges generally between 1% and 15% and preferably from about 3% to about 8%.

During the coating process, the modified thermally-degraded polyethylene is preferably maintained at a temperature substantially equal to that at which it was mixed in order to achieve optimum results.

The drying of steps 2 and 5 are preferably carried out at room temperature although drying at suitable elevated temperatures which do not detract from the product of the invention may also be performed.

The fusing of the modified thermally-degraded polyethylene which is performed in step 3 can be accomplished by heating to the melting point of the modified thermally-degraded polyethylene layer which is about 160° F. but should not exceed about 265° F. at which temperature the interlayer will begin to degrade and exhibit color change. According to the preferred embodiment, the coated film change. According to the preferred embodiment, the coated film base is cured at a temperature of from 160 to 260° F.

The time of heating may range from about 30 seconds up to 10 minutes and according to the preferred embodiment ranges from about 40 seconds up to about 5 minutes.

Similarly, the curing of the overcoated poly(vinyl acetate) layer must be performed at a temperature sufficient to drive off any residual solvents which may be present. Generally, a minimum temperature of about 125° F. will suffice for this, however, the temperature must not be elevated to a degree where it causes degradation of the physical properties of the poly(vinyl acetate) layer, a phenomenon which occurs at about 325° F. In the preferred embodiment, the curing temperature ranges from about 200 to 260° F. and the curing time which may generally range from about 30 seconds up to about 10 minutes or more depending upon the solvent or carrier utilized is preferably limited to from about 40 seconds to about 3 minutes.

A further understanding of the invention will be had from a consideration of the following examples that may also be used in actual commercial practice and are set forth merely to illustrate certain preferred embodiments.

EXAMPLE I

A high density polyethylene resin having a melt index of 5.0 is extruded as sheeting five mils thick. The extruded sheet is compression rolled to one mil. The compression rolled film is roller coated with a dope consisting of: 5% of a thermally-degraded polyethylene reacted with maleic anhydride (acid number—8) 95% toluene. The temperature of the dope is maintained at 130–140° F. during coating. A layer of about 1.2 mils of the dope is coated onto the surface of the film to provide .06 mil of solid maleated thermally-degraded polyethylene after curing. The coated film is dried at room temperature (70° F.), then heated to 205° F. for ten minutes in an air circulating electric oven.

The cured and coated film is then overcoated with 0.2 mil of a dope consisting of:

| | Percent |
|---|---|
| Poly(vinyl acetate) resin [1] | 6.67 |
| Chlorinated paraffin | 3.33 |
| Acetone | 90.00 |

[1] Average molecular weight about 155,000, intrinsic viscosity of 0.68, commercially available as Bakelite AYAT.

The coated film is dried at room temperature, then heated for ten minutes at 230° F.

Properties of the cured film are:

Percent haze—2.9
Young's modulus of elasticity, $10^5$ p.s.i.—3.0
Tensile strength in machine direction (p.s.i.)—17,000
Tear strength in machine directions (grams)—6.0
Moisture vapor transmission (grams/100 in.$^2$/24 hr.)—0.3
Adhesion of coating to support—could not be removed with pressure sensitive adhesive tape
Heat seal temperature range—190–245° F.
Block at 140° F.—very slight block

EXAMPLE II

Example I is repeated but the coating of maleated thermally-degraded polyethylene is omitted. As a result, the poly(vinyl acetate) coating does not adhere to the polyethylene film after curing under "adhesive tape" test.

EXAMPLE III

Example I is repeated but the chlorinated paraffin is omitted from the poly(vinyl acetate) coating. The cured film has properties comparable to those in Example I except that it sticks to itself when subjected to the blocking test.

EXAMPLE IV

Example I is repeated, however, the poly(vinyl acetate) dope applied over the maleated thermally-degraded polyethylene consists of:

| | Percent |
|---|---|
| Toluene | 72 |
| Ethanol | 18 |
| Poly(vinyl acetate) resin (same as Example I) | 7.46 |
| Chlorinated paraffin | 1.6 |
| Carnauba wax | 0.4 |
| Modified fatty amide [1] | 0.4 |
| Ethyl cellulose | 0.1 |
| Cellulose butyrate | 0.04 |

[1] Commercially available as Armour 210.

The dope was cured at 230° F. for 80 seconds.

This procedure yields a multilayer film which has haze (2.3%), slip, scuff and block properties which make it an acceptable food wrapping. It heat seals at 210° F. and the adhesion between the layers is sufficient to resist separation under the adhesive tape test of Example I.

It should be apparent to those skilled in the art that any suitable coating method other than roller coating may be used to apply the two coating layers of this invention.

According to a preferred embodiment of the present invention, the polyolefin film base of the preferred overwrapping is formed by extruding a polyolefin sheet two to eight times thicker than the desired finished film and then compression rolling the extruded sheet to one-half to one-eighth its original thickness. It should be clear, however, that any suitable polyolefin film whether compression rolled or not is suitable for application both in the multilayer film of this invention as well as the process for making the same. Likewise, although tentered polyester films are preferred, any suitable polyester or cellulose ester film manufactured according to conventional means may be utilized as base material.

From the foregoing it can be seen that the new composite polymer film of this invention offers numerous advantages over any that was heretofore known or available to the industry. For example, not only does this novel film exhibit a low sealing temperature and exceptionally high strength, thus making its use in cellophane-type wrapping machines most attractive, but the film in its preferred embodiments also has a low haze value, is easily opened, is moisture resistant and has good machinability due to its stiffness. These characteristics are of particular importance since they permit a manufacturer to apply the clear moistureproof film as an overwrap material on conventional packaging machinery. Furthermore, since the coating need only be applied in an exceptionally thin layer to be most effective, very little expense is involved in coating the support film.

The invention may be embodied in other specific forms without departing from the spirit or essential characteristics of the invention. The present embodiments are therefore to be considered in all respects as illustrative and not restrictive.

We claim:

1. A multilayer heat-sealable film comprising a moisture resistant preformed polymer film base and upon at least one surface of said moisture resistant preformed polymer film base a two-layer coating comprising:
    (a) a modified thermally-degraded polyethylene interlayer consisting essentially of a modified thermally-degraded polyethylene having an acid number of at least 3; said modified thermally-degraded polyethylene having a molecular weight of from about 1,000 to about 10,000 and consisting essentially of a polyethylene which has been thermally degraded and subsequently reacted with a member of the group consisting of unsaturated polycarboxylic acids and anhydrides of unsaturated polycarboxylic acids; and
    (b) a heat-sealable poly(vinyl acetate) resin outer layer.

2. The multilayer film of claim 1 wherein said moisture resistant preformed polymer film base consists essentially of a polymer selected from the group consisting of polyolefins, polyesters, and cellulose esters.

3. The multilayer film of claim 2 wherein said moisture resistant preformed polymer film base consists essentially of a polymer selected from the group consisting of polyethylene, poly(ethylene terephthalate) and cellulose acetate, and has a thickness of at least 1 mil.

4. The multilayer heat-sealable film of claim 3 wherein said modified thermally-degraded polyethylene has an acid number ranging from about 6 to about 20.

5. The multilayer heat-sealable film of claim 3 wherein said modified thermally-degraded polyethylene consists of a maleated polyethylene having an average molecular weight of between about 2500 and about 3000.

6. The multilayer heat-sealable film of claim 3 wherein said modified thermally-degraded polyethylene layer ranges in thickness from about 0.005 mil to about 1.0 mil.

7. The multilayer heat-sealable film of claim 3 wherein said poly(vinyl acetate) layer ranges in thickness from about 0.01 mil to about 0.08 mil.

8. The multilayer heat-sealable film of claim 7 wherein said poly(vinyl acetate) layer includes a chlorinated paraffin.

9. A process for producing a multilayer heat-sealable polymer film comprising the steps of:
    (a) coating at least one surface of a moisture resistant preformed polymer film with a modified thermally-degraded polyethylene-solvent composition; said modified thermally-degraded polyethylene having an acid number of at least about 3 and a molecular weight of from about 1,000 to about 10,000 and consisting essentially of polyethylene which has been thermally-degraded and subsequently reacted with a member of the group consisting of unsaturated polycarboxylic acids and anhydrides of unsaturated carboxylic acids;
    (b) drying said modified thermally-degraded polyethylene-solvent composition to form at least one modified thermally-degraded polyethylene layer on the surface of said film;
    (c) fusing said modified thermally-degraded polyethylene layer;
    (d) overcoating the resulting fused modified thermally-degraded polyethylene layer with a poly(vinyl acetate) resin composition in solution or emulsion form;
    (e) drying said poly(vinyl acetate) resin composition; and
    (f) curing the resulting overcoated and dried poly(vinyl acetate) resin composition to form a poly(vinyl acetate) layer.

10. A process in accordance with claim 9 wherein said moisture resistant preformed polymer film consists essentially of a polymer film selected from the group consisting of polyolefin, polyester and cellulose ester films.

11. A process in accordance with claim 10 wherein said moisture resistant preformed polymer film consists essentially of a polymer film selected from the group consisting of polyethylene, polyethylene terephthalate and celluose acetate films.

12. A process in accordance with claim 11 wherein said modified thermally-degraded polyethylene consists of a maleated polyethylene having a molecular weight of between about 2500 and about 3000 and an acid number ranging from about 6 to about 20, said modified thermally-degraded polyethylene-solvent composition consists essentially of a modified thermally-degraded polyethylene dissolved in toluene, said thermally-degraded polyethylene layer ranges in thickness from about 0.005 mil to about 1.0 mil, and said poly(vinyl acetate) resin solution consists of an amorphous poly(vinyl acetate) resin which is dissolved in acetone and includes a chlorinated paraffin.

13. A process in accordance with claim 11 wherein said modified thermally-degraded polyethylene-solvent composition consists essentially of:

5 weight percent of a thermally-degraded polyethylene reacted with maleic anhydride (acid number 8); and
  95 weight percent toluene;

and said poly(vinyl acetate) resin solution consists essentially of the following mixture, in which percents are by weight:

|  | Percent |
|---|---|
| Toluene | 72 |
| Ethanol | 18 |
| Poly(vinyl acetate) resin | 7.46 |
| Chlorinated paraffin | 1.6 |
| Carnauba wax | 0.4 |
| Modified fatty acid slip agent | 0.4 |
| Ethyl cellulose | 0.1 |
| Cellulose butyrate | 0.04 |

14. A process for producing a multilayer heat-sealable polymer film comprising the steps of:

(a) coating at a temperature of from about 110° F. to about 150° F. at least one surface of a moisture resistant preformed polymer film selected from the group consisting of polyolefin, polyester and cellulose ester films with a modified thermally-degraded polyethylene-solvent composition; said modified thermally-degraded polyethylene having an acid number of at least 3 and a molecular weight of from about 1,000 and about 10,000 and consisting essentially of polyethylene which has been thermally degraded and subsequently reacted with a member of the group consisting of unsaturated polycarboxylic acids and anhydrides of polycarboxylic acids;

(b) drying at about room temperature the resulting coated film to thereby form at least one modified thermally-degraded polyethylene layer on the surface of said film;

(c) fusing at a temperature of from about 160° F. to about 255° F. for from about 40 seconds to about 5 minutes said modified thermally-degraded polyethylene layer;

(d) overcoating the resulting fused layer with a poly(vinyl acetate) resin composition in solution or emulsion form to thereby form a layer of said poly(vinyl acetate) resin composition on the surface of said fused layer;

(e) drying at about room temperature said poly(vinyl acetate) resin composition to thereby form a poly(vinyl acetate) resin layer; and (f) curing, at a temperature of from about 200° F. to about 260° F. for from about 40 seconds to about 3 minutes, the resulting overcoated and dried poly(vinyl acetate) resin layer.

References Cited

UNITED STATES PATENTS

| 3,242,002 | 3/1966 | Brader. |
| 3,250,639 | 5/1966 | Stead. |
| 3,290,166 | 12/1966 | Sharp et al. |
| 3,399,071 | 8/1968 | Schaufelberger et al. |

MURRAY KATZ, Primary Examiner

RALPH HUSACK, Assistant Examiner

U.S. Cl. X.R.

117—68, 92, 122, 138.8, 145